(12) United States Patent
Bakx et al.

(10) Patent No.: US 8,059,509 B2
(45) Date of Patent: Nov. 15, 2011

(54) OPTICAL DISK DRIVE AND METHOD FOR USE WITH AN OPTICAL DISK DRIVE FOR DETERMINING THE DISK CHARACTERISTIC

(75) Inventors: Johannes Leopoldus Bakx, Taipei (TW); Jean Phillippe van Damme, Taipei (TW); Petrus Antonius Verbeek, Taipei (TW)

(73) Assignee: Lite-On It Corporation, Taipei (TW)

( * ) Notice: Subject to any disclaimer, the term of this patent is extended or adjusted under 35 U.S.C. 154(b) by 213 days.

(21) Appl. No.: 12/574,905

(22) Filed: Oct. 7, 2009

(65) Prior Publication Data

US 2010/0157761 A1   Jun. 24, 2010

Related U.S. Application Data

(60) Provisional application No. 61/139,188, filed on Dec. 19, 2008.

(51) Int. Cl.
*G11B 7/00* (2006.01)
(52) U.S. Cl. ...................................... 369/53.2
(58) Field of Classification Search ............... 369/53.2, 369/53.23, 53.41; 720/663, 660, 725
See application file for complete search history.

(56) References Cited

U.S. PATENT DOCUMENTS

| 5,164,934 A * | 11/1992 | Kase et al. ..................... 720/645 |
|---|---|---|
| 7,035,197 B2 * | 4/2006 | Okada ......................... 369/53.18 |
| 7,134,126 B2 * | 11/2006 | Kim .............................. 720/604 |
| 7,260,041 B2 * | 8/2007 | Ezawa et al. .................. 369/53.2 |
| 7,260,831 B1 * | 8/2007 | Beznosov et al. ................. 726/2 |
| 2002/0051413 A1 * | 5/2002 | Choi et al. ..................... 369/53.2 |
| 2003/0081526 A1 * | 5/2003 | Choi et al. ..................... 369/77.2 |
| 2003/0123358 A1 * | 7/2003 | Kanda et al. ................ 369/53.22 |
| 2005/0063269 A1 * | 3/2005 | Miyake et al. ................ 369/53.2 |
| 2007/0203913 A1 * | 8/2007 | Yamazaki et al. ............... 707/10 |
| 2008/0025161 A1 * | 1/2008 | Jeong ......................... 369/44.11 |
| 2008/0109835 A1 * | 5/2008 | Igi ................................ 720/695 |

* cited by examiner

*Primary Examiner* — Thang Tran
(74) *Attorney, Agent, or Firm* — Thomas, Kayden, Horstemeyer & Risley, LLP

(57) ABSTRACT

An optical disk drive for determining a disk characteristic of an optical disk comprising an information layer comprising a substantially circular track is described. The optical disk drive has an optical pickup unit arranged to generate a beam, direct the beam to the optical disk for forming an incident beam, sense a reflected beam produced by the optical disk with a sensor upon receiving the incident beam with the sensor, produce a sensor output signal from sensing the reflected beam; a disk receiving device arranged to receive the optical disk; a motor arranged to provide a transition of the disk receiving device from a first mode to a second mode in at least one transition phase; and a controller arranged to receive the sensor output signal during at least one part of the at least one transition phase and perform at least part of determining the disk characteristic from at least the sensor output signal received during the at least one part of the at least one transition phase. The transition phase can be associated with moving the optical disk into the optical disk drive with a disk load motor. The transition phase can be associated with changing a rotational speed of the optical disk with a spindle motor. Determining the disk characteristic can include a disk recognition preparation.

17 Claims, 10 Drawing Sheets

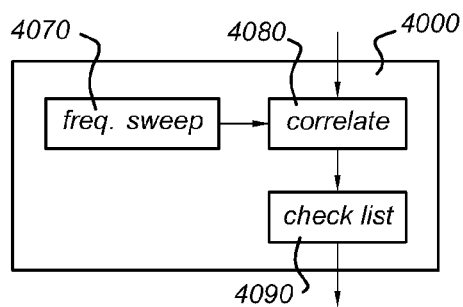
Fig 12d
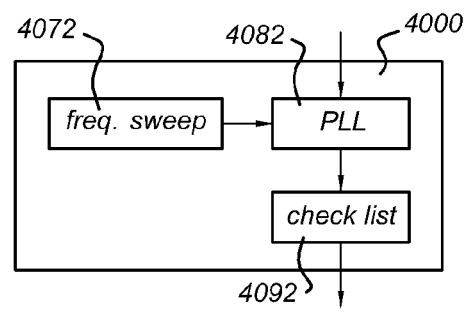
Fig 12e
Fig 12f
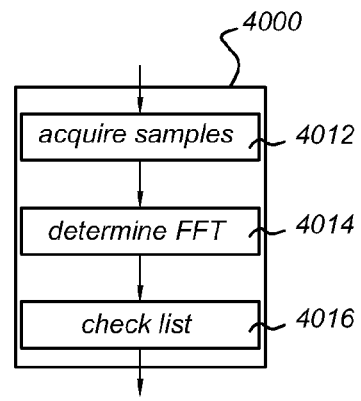

OPTICAL DISK DRIVE AND METHOD FOR USE WITH AN OPTICAL DISK DRIVE FOR DETERMINING THE DISK CHARACTERISTIC

CROSS REFERENCE TO RELATED APPLICATION

This application claims the benefit of priority under 35 U.S.C. Section 119 from U.S. Provisional Patent Application Ser. No. 61/139,188, filed on Dec. 19, 2008.

FIELD

The invention relates to an optical disk drive and a method for use with an optical disk drive for fast startup of the optical disk drive.

BACKGROUND

Optical disks may generally be used as removable media for retrieving and storing digital information, e.g. data, audio and video. Optical disks may be classified into disk types according to disk generations into Compact Disc (CD), Digital Versatile Disc (DVD) and Blu-Ray Disc (BD). Optical disks may further or alternatively be classified into read-only (ROM) disks and writable disks. Writable disks may further be classified into recordable (R) and rewritable (RW, RE, RAM) disks. Currently trends include miniaturizing a spot diameter using a high numerical aperture (NA) objective lens and using increasingly shorter wavelength light sources.

An optical disk drive may be arranged to handle optical disks of multiple generations and multiple disk types. An optical disk drive may e.g. be arranged to read and write CD-generation disks, DVD-generation disks as well as BD-generation disks. An optical disk drive may further be arranged to read read-only disks of one or more disk generations, e.g. CD-ROM, DVD-ROM and BD-ROM disks. An optical disk drive may further be arranged to e.g. read and write a plurality of writable disks of one or more disk generations. An optical disk drive may further be arranged to e.g. read and/or write at least a plurality of DVD-types, e.g. DVD-R, DVD-RW, DVD+R, DVD+RW and DVD-Qflix disks, optionally in a plurality of speed grades.

Each disk type may require operation conditions specific for the disk type. E.g., an optical disk drive may be arranged to scan (read and/or write) a CD-generation disk with a infrared focussing spot using an infrared laser at a numerical aperture of e.g. 0.50 of an objective lens, a DVD-generation disk with a red focussing spot using a red laser at a numerical aperture of e.g. 0.65, and a BD-generation disk with a blue focussing spot using a blue-violet laser at a numerical aperture of e.g. 0.85. Additionally, other operation conditions, such as e.g. scanning velocity, write strategy parameters, servo system settings and read channel settings, may depend on the disk generation, on the disk type in general or on other disk characteristics. Other disk characteristics may e.g. comprise a disk reflectance, a number of information layers on the disk, an optical aberration induced by the optical disk in the optical disk drive (e.g. by disk tilt or other disk-induced aberrations), a start radius of a data area, or any other disk characteristic that may vary from one individual disk to another. For setting the operating conditions for scanning, i.e. reading and/or writing, an optical disk, the optical disk drive may thus be arranged to determine a disk characteristic, e.g. to perform a disk type detection. After the disk characteristic is determined, e.g. after the disk type is detected, the optical disk drive may set the corresponding operating conditions.

In starting-up of an exemplary known optical disk drive, e.g. after loading a new optical disk drive or after powering-on of the optical disk drive, the exemplary known optical disk drive is arranged for determining one or more disk characteristics of the optical disk loaded in the optical disk drive. The one or more disk characteristics typically comprises the disk type. This starting-up can consume considerable time, referred to as startup time, and may take e.g. several seconds in known optical disk drives.

With an exemplary known optical disk drive, determining the disk type comprises checking whether the optical disk comprises a wobble by checking a tracking error signal for the presence of a wobble signal while the optical disk is rotated at a constant, pre-determined disk speed. The absence of a wobble signal may be indicative for the disk type being one of a group of read-only disk types (ROM disk types). When a wobble signal is present, a wobble period may be determined, to discriminate whether the disk type is either a) a DVD-R or DVD-RW, b) a DVD+R, DVD+RW, c) a DVD-Qflix, or d) another unsupported DVD-type disk, as each of these disk types is standardized with its specific wobble period.

Known optical disk drives using known methods to determine a disk characteristic, e.g. to determine the disk type as described in the example above, may require a considerable time before determining the disk characteristic is complete, resulting in a considerable startup time.

SUMMARY

It is an aim of the invention to provide an optical disk drive and a method to determine the disk generation with a reduced startup time. In particular, it is an aim of embodiments of the invention to provide an optical disk drive and a method with a reduced time for determining a disk characteristic of the optical disk. Further embodiments aim to provide an optical disk drive and a method with a reduced time for determining a disk type of the optical disk from wobble characteristics of the optical disk.

A first aspect of the invention provides an optical disk drive for determining a disk characteristic of an optical disk comprising an information layer comprising a substantially circular track, the optical disk drive comprising:
  an optical pickup unit arranged to:
    generate a beam,
    direct the beam to the optical disk for forming an incident beam,
    sense a reflected beam produced by the optical disk with a sensor upon receiving the incident beam with the sensor,
    produce a sensor output signal from sensing the reflected beam,
    focus the incident beam into a spot on the information layer,
    position the spot at a radial position along the optical disk, and
    track the track with the spot,
  a disk receiving device arranged to receive the optical disk,
  a motor arranged to:
    provide a transition of the disk receiving device from a first mode to a second mode in at least one transition phase, and
  a controller arranged to:
    receive the sensor output signal during at least one part of the at least one transition phase, and perform at least part of determining the disk characteristic from at least the sensor output signal received during the at least one part of the at least one transition phase.

A second aspect of the invention provides a method to determine a disk characteristic of an optical disk in an optical disk drive comprising an information layer comprising a substantially circular track, the method being arranged for:

generating a beam, directing the beam to the optical disk for forming an incident beam, sensing a reflected beam produced by the optical disk upon receiving the incident beam, producing a sensor output signal from sensing the reflected beam with a sensor, focusing the incident beam into a spot on the information layer, and positioning the spot at a radial position along the optical disk, receiving the optical disk with a disk receiving device, provide a transition of the disk receiving device from a first mode to a second mode in at least one transition phase, and receive the sensor output signal during at least one part of the at least one transition phase, and perform at least part of determining the disk characteristic from at least the sensor output signal received during the at least one part of the at least one transition phase.

Another aspect of the invention provides a computer program product arranged to be loaded in a processor and after being loaded allowing the processor to carry out the method described above.

SHORT DESCRIPTION OF FIGURES

These and other aspects of the invention will be further elucidated and described in detail with reference to the drawings, in which corresponding reference symbols indicate corresponding parts:

FIG. 1a schematically shows the top-view of an optical disk;

Figure 2:
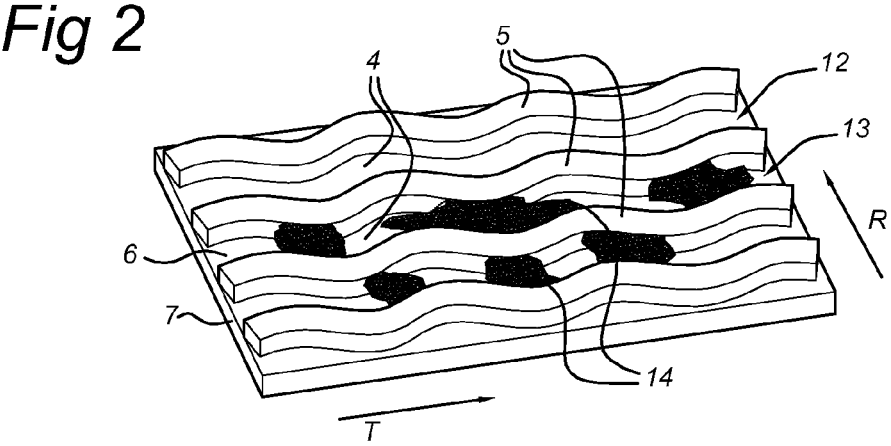
Figure 3:
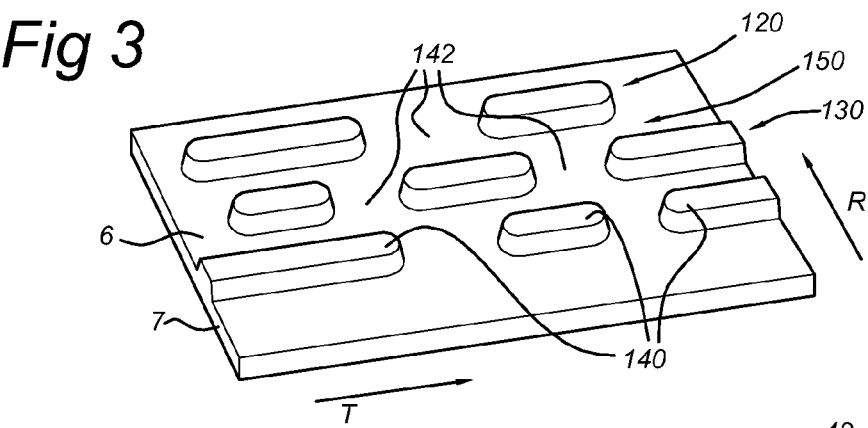
Figure 5:
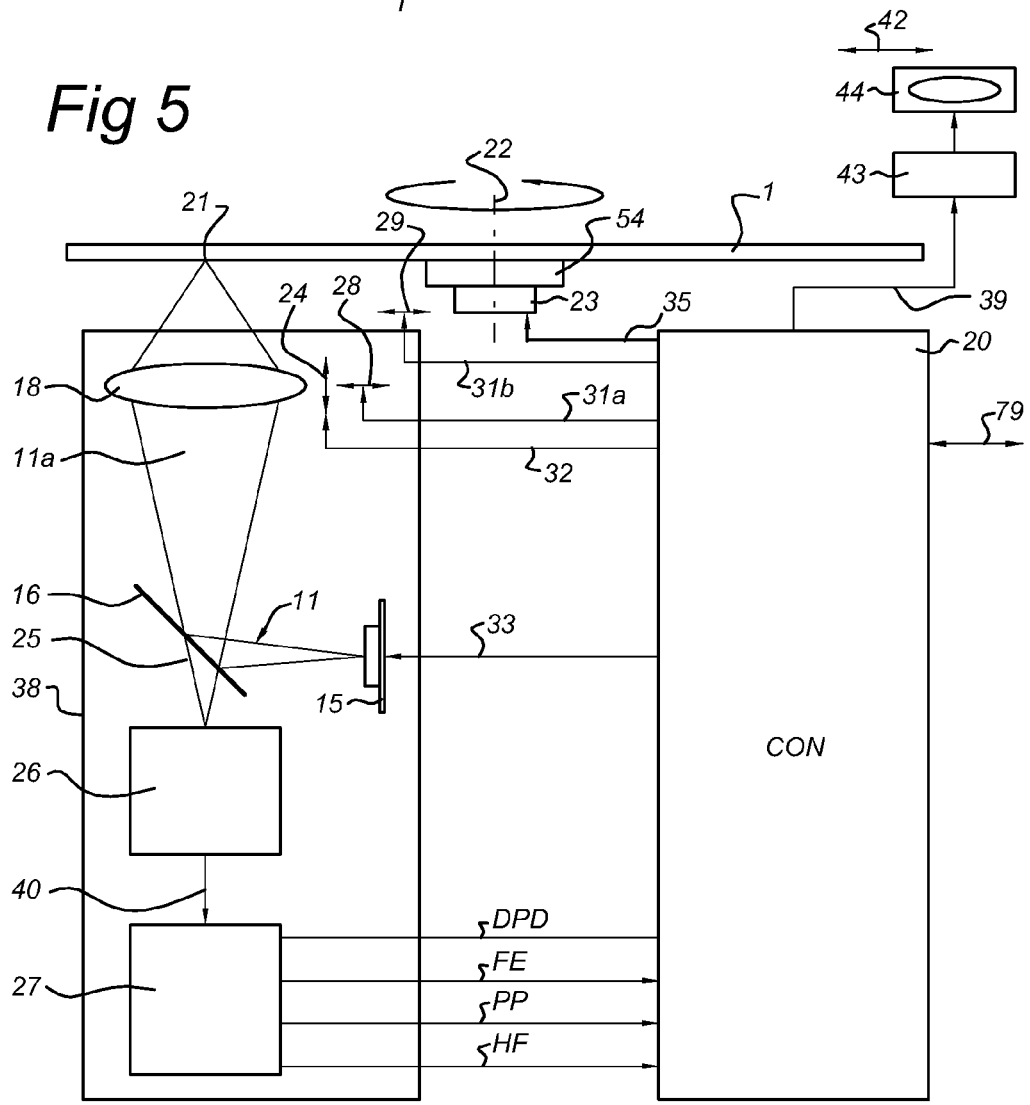
Figure 4:
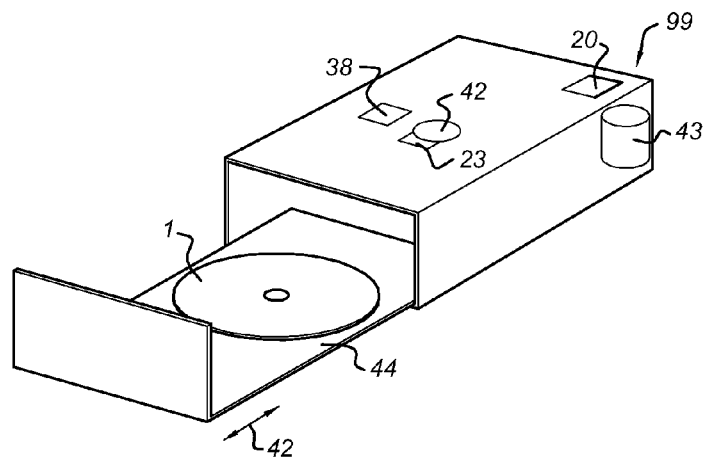
Figure 6:
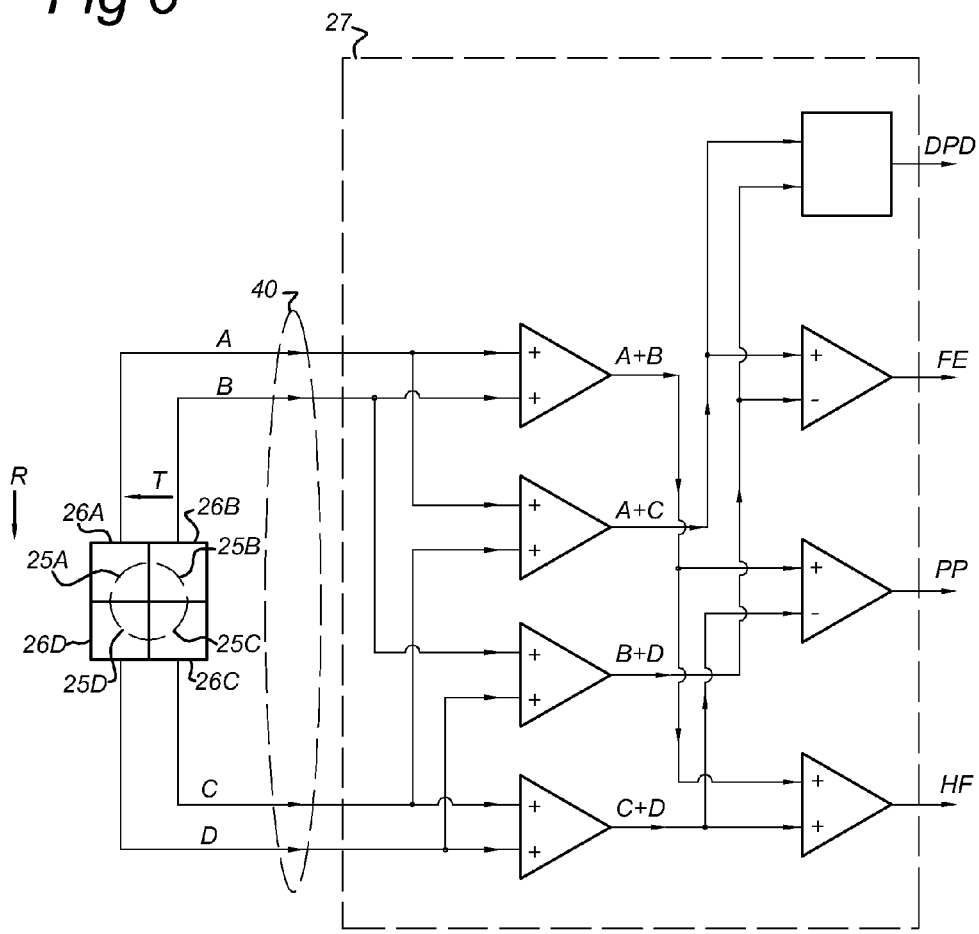
Figure 7:
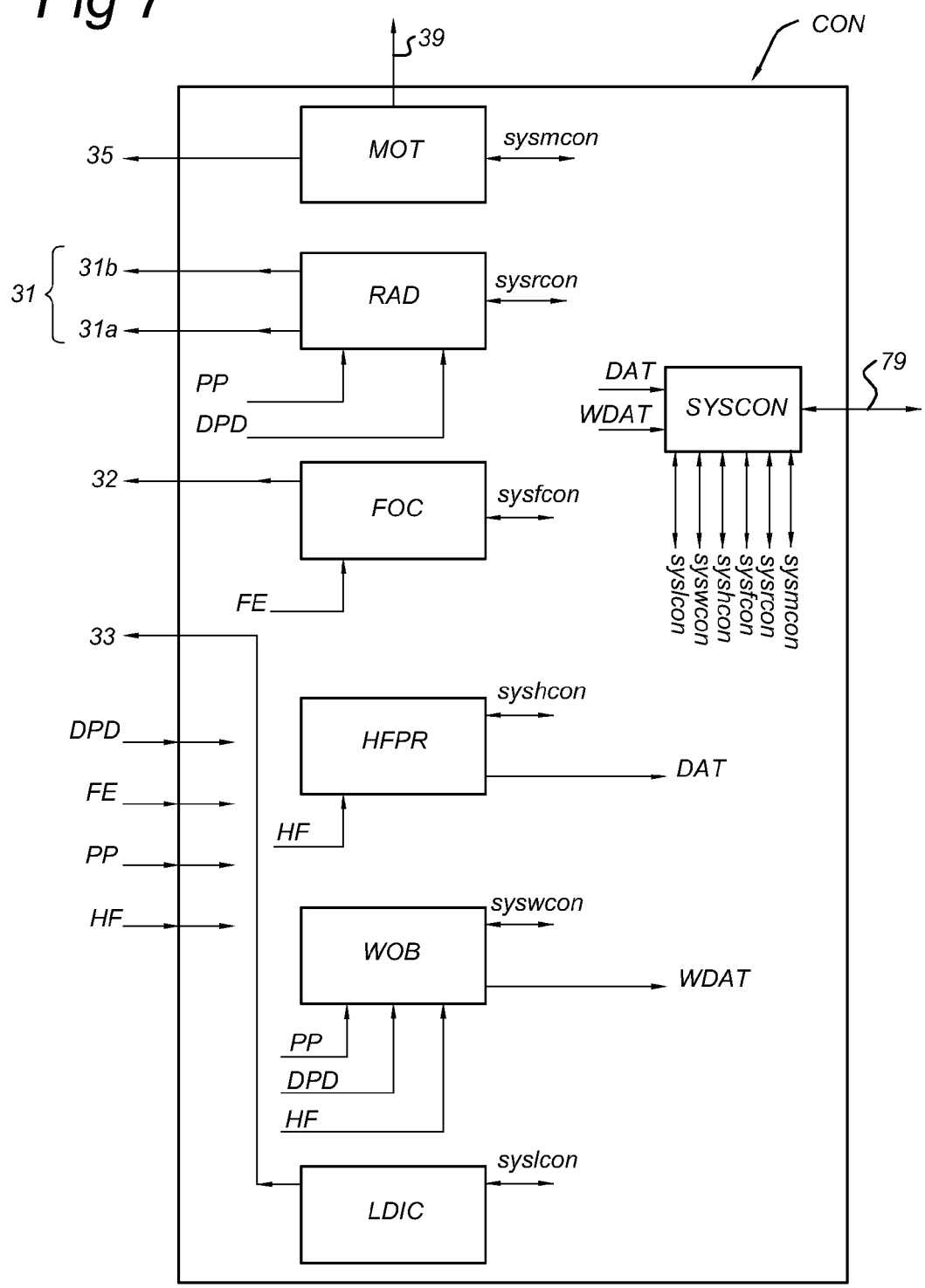
Figure 8:
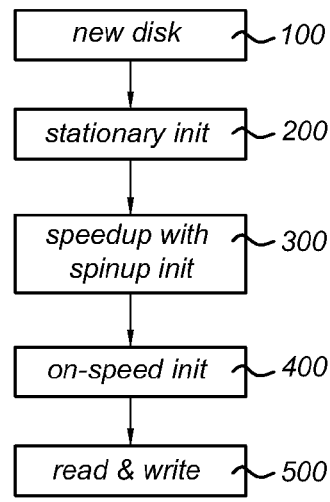
Figure 13:
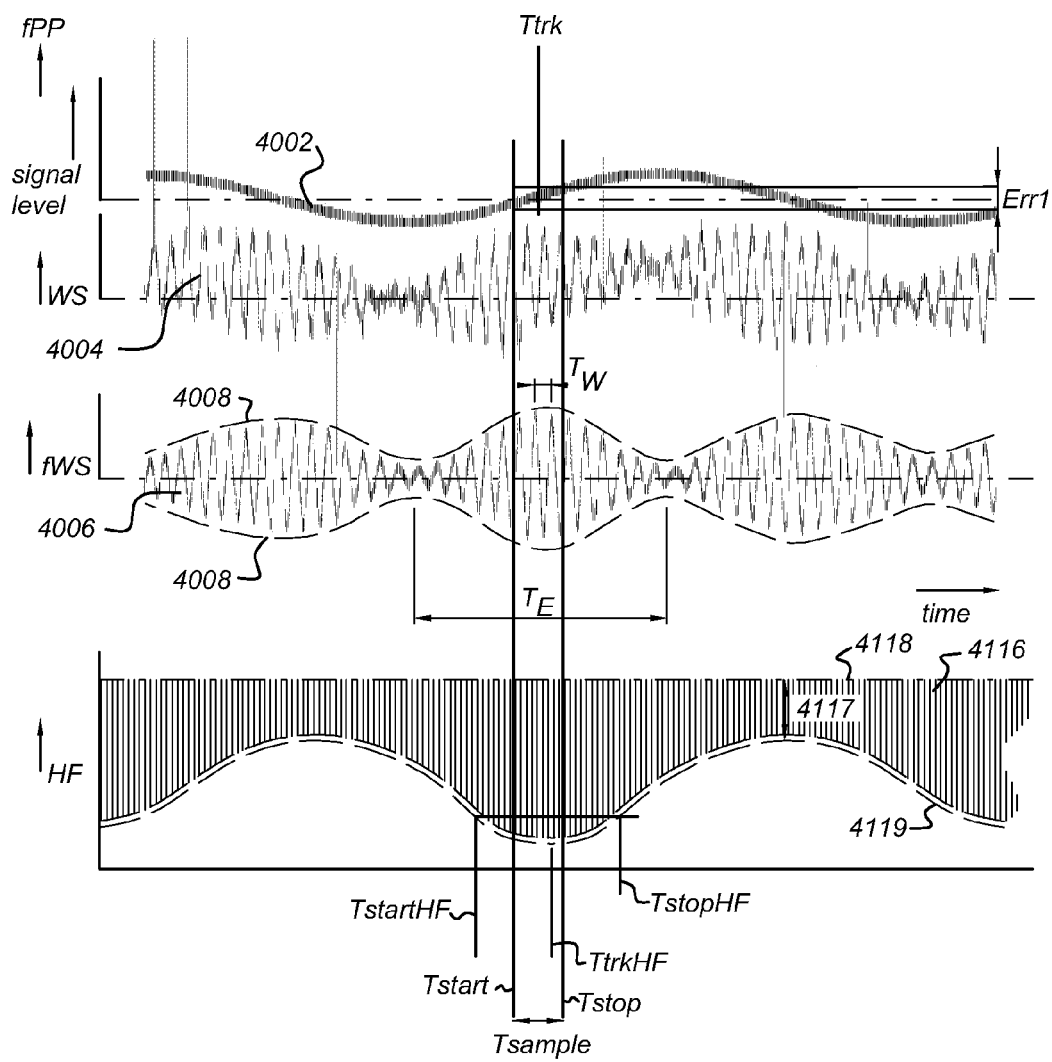
Figure 14:
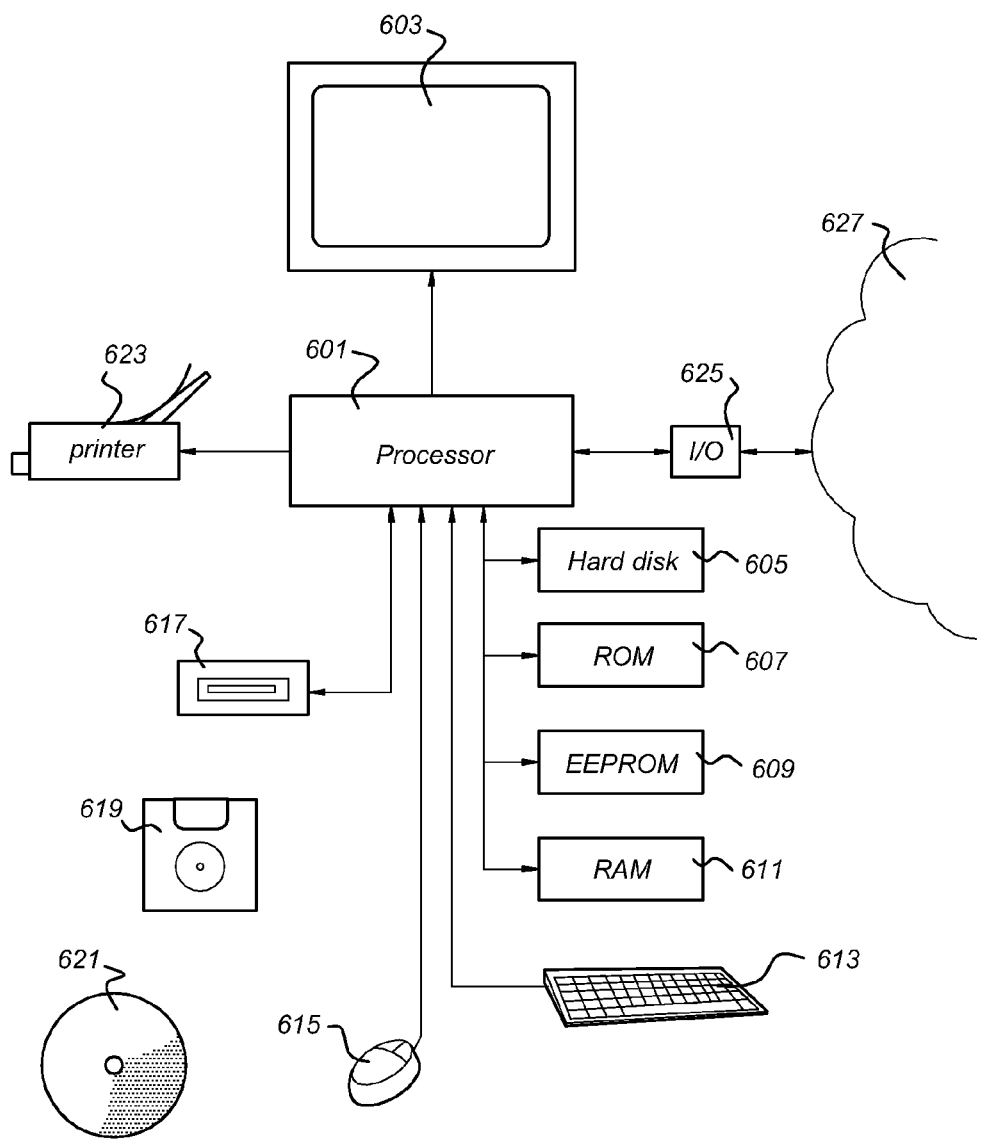

FIG. 2 schematically shows a wobbled groove and recorded information marks in the grooves on an optical disk of one of a recordable or rewritable type;

FIG. 3 schematically shows embossed marks on an optical disk of a read-only type;

FIG. 4 schematically shows an optical disk drive;

FIG. 5 schematically shows an optical disk drive during use with an optical disk;

FIG. 6 schematically shows a signal processing unit of an optical disk drive;

FIG. 7 schematically shows a controller of an optical disk drive;

FIG. 8 schematically shows an embodiment of a method according to the invention;

FIG. 9, FIG. 10, FIG. 11 and FIG. 12a to FIG. 12f schematically show embodiments of elements of the method according to the invention;

FIG. 13 schematically shows a radial error signal, a wobble signal and a central aperture signal associated with an optical disk with a wobbled track in an optical disk drive; and FIG. 14 shows an overview of a computer arrangement that can be used to carry out the method according to the invention.

DETAILED DESCRIPTION

Figure 1A:
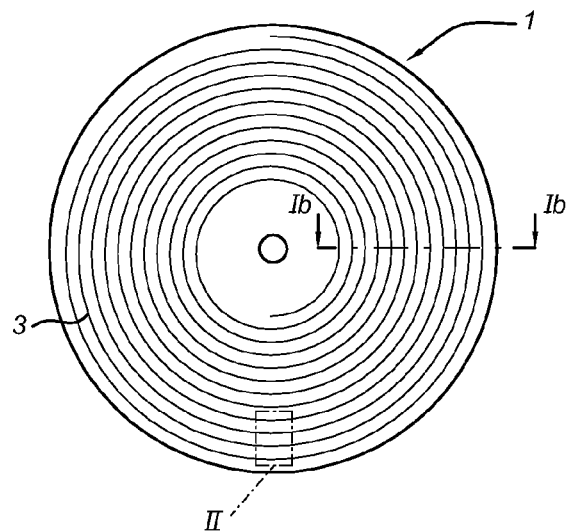
FIG. 1b shows a cross section of an optical disk with one recording layer.
FIG. 1c shows a cross section of an optical disk with two recording layers.
Figure 1B:
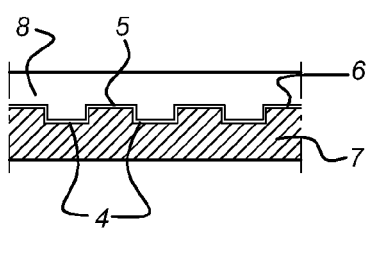
Figure 1C:
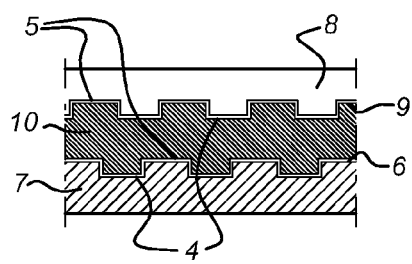

FIGS. 1a-c show an optical disk 1 and FIG. 2 shows a detailed view of area II of the optical disk 1. The optical disk has a substantially circular, spiralling track 3. The track 3 is a groove 4 in a surrounding surface area 5, also called land, of a substrate 7. A recording layer 6 is deposited on the substrate 7. The recording layer 6 is covered with a cover layer 8. In a Blu-Ray disk (BD), the cover layer is a transparent cover layer having a nominal thickness of 0.100 mm, and access of the tracks is done through this transparent cover layer. In a DVD disk or a HD-DVD disk, access is done through the substrate 7, which has a thickness of 0.6 mm. In a CD disk, access is done through the substrate 7, which has a thickness of 1.1-1.2 mm.

A Blu-Ray disk may alternatively comprise a flat substrate 7, with the track 3 being replicated in or on the cover layer 8 and the recording layer 6 being deposited on the cover layer 8. The cover layer 8 can, e.g., be a foil sheet, which is glued to the substrate 7.

It is noted that, when referring to the substrate thickness of a Blu-Ray disk, the thickness of the transparent cover layer 8 is meant.

The optical disk 1 may have a single recording layer 6 as shown in FIG. 1b. The optical disk 1 may also have multiple recording layers 6, 9, separated by a transparent spacer layer 10 as shown in FIG. 1c. In a Blu-Ray disk with multiple recording layers, the spacer layer 10 usually has a thickness in the range of 0.020 mm-0.030 mm.

The disk is produced as a disk with empty tracks 12, as is shown in FIG. 2. The track can accommodate marks 14 which can be written on the track with an optical disk drive. The marks 14 are separated along the track by spaces. The marks can be erased and overwritten in, e.g., a rewritable Blu-Ray disk (BD-RE disk), but can also be of a permanent nature as in a recordable Blu-Ray disk (BD-R disk). The marks and spaces are of various lengths, and carry data information. These marks and spaces can be read out with an optical disk drive, as scanning along the track over these marks and spaces results in a modulation of light reflected on the disk, which is detected by the optical disk drive with a sensor.

As shown in FIG. 2, the track 3 may have a sinusoidal deviation from its nominal position into the radial direction R of the disk. This sinusoidal deviation is called the wobble. The wobble can be a fixed-frequency continuous sinusoidal for use as a time reference signal, e.g., to which the disk speed or a signal clock can be related, or a modulated sinusoidal encoding wobble data information, e.g., a frequency-modulated sinusoidal with a modulation around a center frequency with the center-frequency being referred to as the wobble frequency or a phase-modulated sinusoidal with a substantially fixed frequency with the substantially fixed frequency being referred to as the wobble frequency. Various standardized optical disk systems use the wobble for carrying information to classify the disk and the values of various parameters, e.g., the address of a specific location on the disk and write strategy parameter values. Disks according to the DVD+RW, BD-RE and BD-R standards have a phase-modulated wobble at a fixed spatial period measured along the track. Disks according to the DVD-RW standard have a frequency-modulated wobble using modulation around a center-frequency.

The track 3 may also comprise portions where the continuous groove 4 is preceded or interrupted by a series of embossed pits, so-called header marks (not shown). The header marks may carry information to classify the disk and the values of various parameters, alternatively or additionally to the information in the wobble. Alternatively or additionally, the continuous land portion 5 may also be interrupted by embossed pits (not shown), so-called land pre-pits, as, e.g., in disks according to the DVD-R standard. Alternatively or additionally, embossed pits may also be positioned in between the groove 4 and the land portion 5, as, e.g., in disks according to the DVD-RAM standard.

FIG. 3 schematically shows embossed marks on an optical disk of a read-only type.

The read-only disk is produced as a disk with a spiralling track 3, of which subsequent turns may be referred to as grooves 120, 130. The spiralling track is formed by a series of marks 140. The marks 140 are separated along the track by spaces 142. The grooves 120, 130 are separated by an area referred to as land. As the land has the same physical level on the substrate 7 as the spaces 142, it is general phrasing to also refer to the spaces 142 in between the marks 140 as land. The marks 140 may be pits in the substrate or elevations on the substrate, and are generally referred to as embossed pits for either situation. The surface of the substrate 6 carrying the pits may be referred to as the information layer.

FIG. 4 and FIG. 5 show an exemplary optical disk drive 99. The optical disk drive 99 comprises a housing with a loader mechanism allowing a user to insert an optical disk 1 into the optical disk drive 99 and remove the optical disk 1 from the optical disk drive 99. In the shown example, the loader mechanism comprises a tray 44 which can be driven by a loader motor 43, so as to move from one position to another position along a direction shown with arrow 42. In particular, the tray 44 can be moved from an "open" position in which the user can insert an optical disk 1 to a "closed" position where the optical disk 1 is delivered to a spindle 54 and where the optical disk 1 can be accessed using an optical pickup unit 38, and back to the "open" position for removing the optical disk 1 after use. Moving the tray from one position to another is further referred to as a tray movement phase. The spindle 54 can be rotated using a spindle motor 23. The optical pickup unit 38 may also be referred to as an optical head, integrally movable substantially parallel along the optical disk 1 in a radial direction relative to the optical disk 1. The loader mechanism, the spindle motor 23 and the optical pickup unit 38 are controllable from a control unit 20, which will be described in more detail with reference to FIG. 7.

FIG. 5 shows the optical disk drive during use with the optical disk 1. The optical disk 1 is positioned on the spindle 54, and e.g. clamped to the spindle 54. The spindle 54 rotates with the optical disk 1 about an axis 22 operated by the spindle motor 23. An optical source 15, here shown as a laser diode 15, generates an incident optical beam 11, which is directed onto the optical disk via a beam splitter 16, and an objective lens 18. The beam splitter 16 steers the beam over a 90 degree angle. The incident beam 11*a* is focused by the objective lens 18 into a focussing spot 21 on the track 3. The optical disk is rotated about the axis 22 by the spindle motor 23 for the spot 21 to scan the tracks along the track. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow radial excursions of the track when the track 3 is somewhat eccentric to the axis 22. The optical disk drive may further comprise a spherical aberration correction actuator (not shown), capable of applying a correction to the incident beam to compensate for a difference in spherical aberration originating from a substrate thickness (or for BD, cover layer thickness) being different from its nominal value. Likewise, a difference in spherical aberration originating from a spacer layer can also be compensated for when focussing on the different layers of a multi-layer disk. The entire optical system is fitted onto a single support so as to constitute an integrally movable optical head 38. The movement of the optical head is performed by a head motor 29. A control unit 20 controls the actuators 24, 28 and 29 to keep the optimal position for the objective lens 18 while the disk 1 is rotating. The optical disk 1 reflects the incident beam. The reflected beam 25 is separated from the incident beam by the beam splitter 16. An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27.

As is shown in detail in FIG. 6, the sensor may be a quadruple photodetector 26, having four sensor segments 26A-26D for sensing the intensities of four portions of the reflected beam 25. The sensor signal 40 comprises four channels, A-D, one for each sensor segment. The arrow R represents the relation between the beam portions and the radial direction of the optical disk 1 and the arrow T represents the relation between the beam portions and the tangential direction of the optical disk 1. I.e., sensors 26A and 26B detect intensities corresponding to the inner upper and inner lower quarters respectively of spot 21 as reflected by the optical disk 1, and sensors 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a central aperture signal HF=A+B+C+D, a radial tracking error signal or radial push-pull signal PP=(A+B)−(C+D) and, for an astigmatic focussing method, a focus error signal FE=(A+C)−(B+D). The central aperture signal may also be referred to as the data signal. The error signal may be of this form, but may also be normalized, with a normalized radial push-pull signal NPP=((A+B)−(C+D))/(A+B+C+D) and a normalized focus error signal NFE=((A−B)/(A+B))+((C−D)/(C+D)). Another focussing method may alternatively be used, such as the spot-size method or the Foucault method, with a corresponding focus error signal FE. In the exemplary embodiment of the pre-processing unit 27, the pre-processing unit 27 further comprises a DPD detector circuit 28, capable of producing an alternative radial error signal for radial tracking on a ROM disk when the information layer has embossed marks 140, e.g. with DVD-ROM disks. The DPD detector circuit 28 processes intensity signals A-D so as to produce a so-called Differential Phase Detection signal from a phase difference between the sum signal of signal A and C and the sum signal of signal B and D. This phase difference may be expressed as DPD=phase(A+C)−phase(B+D). Throughout this text, "a sensor output signal" may refer to the sensor signal 40, one or more of the channels A-D of the sensor signal 40, and/or signals determined from the one or more of the channels A-D of the sensor signal 40, such as the central aperture signal HF, a tracking error signal TE corresponding to the radial push-pull signal PP and/or the Differential Phase Detection signal DPD, and the focus error signal FE.

The thickness of the substrate through which the information layer 6, 9 is accessed with the incident beam 11 may approximately be determined by monitoring the focus error signal FE and/or the central aperture signal HF together with the drive signal 32 of the focus actuator 24. The drive signal level of the drive signal 24 is a measure of the distance that the objective lens is moved towards or away from the disk. When the objective lens 18 is moved from a distant position towards the disk by varying the drive signal level, the error signal FE and/or the central aperture signal HF may first show a presence of the interface 70 between air and the substrate 7, and next show a presence of the interface between the substrate 7 and the information layer 6. When the disk is a two-layer disk, another information layer 9 is also detected. As each different substrate thickness, i.e., each different depth of the information layer, is associated with a specific drive signal level, the substrate thickness may be estimated from the drive signal level at which the presence of the information layer 6, 9 is detected. The thickness of the substrate 7 may be used in determining the disk type, as it discriminates between the 1.2 mm disk types (CD), the 0.6 mm disk types (DVD and HDDVD) and the 0.1 mm disk types (BD).

FIG. 7 shows a control unit CON of the optical disk drive. The control unit CON may include one or several microprocessors or digital signal processors. The control unit CON is responsible for several control tasks. The tasks can be executed in the control unit itself, or in an external processor cooperating with the control unit.

The radial push-pull signal PP (or NPP) may be passed to a radial tracking controller RAD. For tracking a ROM disk, the DPD signal DPD may be passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal, PP or DPD, substantially has a predetermined value, also called tracking offset. This tracking offset is usually zero. The tracking controller RAD may also be equipped to measure a quality of the radial error signal. Measures used commonly in the art include a push-pull signal amplitude, a DPD signal amplitude and a wobble signal amplitude.

The focus error signal FE (or NFE) is passed to a focus controller FOC. Arrow 32 represents the capability of the focus controller FOC to control the focus actuator 24, so as to keep the focussing spot 21 focused at the correct depth in the track 3. For this purpose, the focus controller FOC controls the focus actuator 24 such that the focus error signal has a substantially predetermined value, also called focus offset.

The data signal HF may be passed to a data recovery mechanism HFPR. The data recovery mechanism HFPR retrieves the data as recorded with the marks 14 and spaces 13 on the recordable optical disk 1, or as present as embossed pits 140 and spaces 150 on a ROM disk. The processing of the data signal HF and the further processing of the recovered data will not be further described here.

Arrow 33 denotes the capability of a laser driver controller LDIC to control the laser diode 15, for example to control the intensity of the incident beam 11. The LDIC may be physically located inside the controller CON, but may alternatively be located on the optical head 38 close to the laser diode 15.

Arrow 35 denotes the capability of a motor controller MOT to control the spindle motor 23. A speed of the spindle motor 23 may be adjusted, e.g., to scan the optical disk 1 with a well-defined linear speed or a well-defined angular speed.

Arrow 39 denotes the capability of the motor controller MOT to control the loader motor 43 for moving the tray 44.

The tracking error signal TE, i.e. radial push-pull signal PP (or NPP) and/or the differential phase detection signal (DPD), are also passed to a wobble processor WOB. In this exemplary embodiment, the central aperture signal HF is also passed to the wobble processor WOB. When scanning the track, the amplitude of the radial push-pull signal PP and/or the differential phase detection signal DPD may show a variation as a function of time as a result of the wobble on the disk. This variation is also commonly referred to as a wobble signal WS. The wobble signal WS can also be observed as a relatively high-frequent component of the radial push-pull signal PP and/or the differential phase detection signal DPD when the radial servo loop is not closed, i.e. during open-loop radial tracking. The wobble processor WOB may generate a digital wobble data signal WDAT from the wobble signal WS when tracking the track 3. The digital wobble data signal WDAT may further be processed by a digital processor SYSCON, in order to retrieve so-called wobble data coded in the wobble. The wobble data may, e.g., comprise the physical address of the location on the disk, standard write strategy information such as laser power and timing parameters for writing marks, disk information such as the disk manufacturer. The use of the wobble data will not be further described here. The wobble processor WOB may also retrieve a frequency corresponding to the spatial frequency of the wobble on the disk 1 from the wobble signal WS. The wobble processor WOB may also be equipped to measure a quality of the wobble signal WS. Measures used commonly in the art include wobble amplitude, wobble signal-to-noise ratio (wSNR), wobble error rate. The wobble on the disk may also result in a detectable contribution to the central aperture signal HF when the radial servo loop is not closed, i.e. during open-loop radial tracking This detectable contribution may also be referred to as the wobble signal WS when referring to a wobble signal determined from the central aperture signal.

The digital processor SYSCON may also provide and monitor information, such as control settings, via control lines SYSHCON, SYSRCON, SYSFCON, SYSLCON, SYSWCON, SYSMCON, to and from the data recovery mechanism HFPR, the radial tracking controller RAD, the focus controller FOC, the laser driver controller LDIC, the wobble processor WOB, and the motor controller MOT. The wobble processor WOB may e.g. receive the speed of the motor MOT via control lines SYSWCON and SYSMCON. The wobble processor WOB may e.g. receive the position of the optical head 38, corresponding with an approximate radial position along the optical disk 1 from the radial tracking controller RAD via control lines SYSWCON and SYSMCON. The digital processor SYSCON may also communicate to external components, e.g., a host computer in which the optical disk drive is mounted via interface 79.

The control unit CON may be arranged for aiming to scan the track 3 on the optical disk 1 with an optimal quality of the spot 21. For this purpose, the digital processor SYSCON can, e.g., retrieve a measurement value of push-pull signal amplitude from the radial tracking controller RAD, a measurement value of jitter from the data recovery mechanism HFPR, and a measurement value of wobble amplitude from the wobble processor WOB. By comparing a selection of these measurement values as a function of one or more operating parameters of the various controllers, the digital processor SYSCON may generate optimal values for the operating parameters.

The control unit CON may also comprise a memory unit (not drawn) or cooperate with an external memory device (not drawn), to store and retrieve e.g. control settings, measurement values, values for the operating parameters, one or more tables comprising information related to disk classes, disk types, disk information, write strategies, etc.

In determining the disk type, an exemplary prior art optical disk drive may be arranged to determine the disk type of an optical disk 1 in the optical disk drive using e.g. first a measurement of a substrate thickness of the optical disk 1, as CD-generation disks, DVD-generation disks and BD-generation disks have a different substrate thickness, i.e. of approximately 1.1-1.2 mm, 0.6 mm and 0.1 mm respectively. This first measurement is generally performed while the optical disk 1 is stationary, to prevent possible damage to the optical disk and/or the optical disk drive (e.g. an objective lens of the optical disk drive). This first measurement uses a first check using an infrared CD-laser for determining whether the substrate thickness of the optical disk 1 is compatible with a CD-type disk, a second check using a red DVD-laser for determining whether the substrate thickness of the optical disk 1 is compatible with a DVD-type disk and a third check using an blue-violet BD-laser for determining whether the substrate thickness of the optical disk 1 is compatible with a BD-type disk. Secondly, the exemplary prior art optical disk drive may set a subset of operating conditions according to the disk generation, e.g. a corresponding laser and a corresponding numerical aperture may be selected for further operation of the optical disk 1. In this example, let us assume that the determined disk generation is a DVD-generation. Thirdly, the exemplary prior art optical disk drive may spin-up the optical disk from its stationary position to a constant and pre-determined disk speed, e.g. to a pre-determined constant angular velocity, by accelerating the spindle motor 23, and position the optical pickup unit 38 with the objective lens 18 approximately at a pre-determined radial position on the optical disk 1. When the spin-up is completed and the constant, pre-determined disk speed is obtained, the optical disk drive may then determine a wobble characteristic of the optical disk 1. The optical disk drive may check whether the optical disk 1 comprises a wobble by checking a tracking error signal TE, e.g. the radial push-pull signal PP or the differential phase detection signal DPD, for the presence of a wobble signal. When no wobble signal is present, the optical disk drive may determine the disk type of the optical disk 1 to be of a DVD-ROM type. This may be confirmed by checking the presence of a DPD tracking signal compatible with a read-only disk with embossed data 140 and by reading embossed data. When a wobble signal is present, the optical disk drive may track the track 3 on the optical disk 1. While tracking the track 3, a wobble period may be determined, to discriminate whether the disk type is either a) a DVD-R or DVD-RW, b) a DVD+R, DVD+RW, c) a DVD-Qflix, or d) another unsupported DVD-type disk, as each of these disk types is standardized with its specific wobble period. Once the wobble period is known, disk information stored in the wobble may be retrieved from wobble characteristics reflected in the wobble signal, to further determine the disk type, e.g. to determine whether the disk type is DVD+R or DVD+RW, and to determine further operating conditions from disk information parameters retrieved from the wobble signal, such as write strategy information. Optical disk type determination is then completed. Typically, the exemplary prior art optical disk drive further performs a scaling of signals, e.g. setting operation conditions for a pre-amplifier based on signal amplitudes of signals. Such signal scaling may be performed before and/or after determining the wobble characteristic. Typically, prior art optical disk drives then perform test recordings, e.g. in a so-called optical power calibration (OPC) procedure, and test readings for optimizing operation conditions associated with reading and writing. Finally, the optical disk drive is ready for reading data from and writing data to the optical disk.

FIG. 8 schematically shows an embodiment of a method according to the invention. The method may be implemented in control unit CON or in another controller cooperating with the control unit CON. The method may be implemented in the wobble processor WOB. The method may be partly implemented in the digital processor SYSCON.

The method starts in block 100. Starting may e.g. be triggered upon the startup of the disk drive after a power-up or after standby. Initializing may e.g. be triggered by the insertion of a new optical disk in the optical disk drive. Inserting the optical disk may be associated with loading an optical disk 1 in the optical disk drive, e.g. by a user and positioning the optical disk on the disk substantially centred with respect to the axis 22 of the motor 23. Starting may e.g. be triggered by starting a new action on an optical disk that is already present already in the optical disk drive, e.g. when the optical disk drive is provided in a computer and a disk-write software application is started on the computer for writing data from the computer to the optical disk drive.

In block 200, a first initialization is performed while the optical disk is stationary, i.e. with zero speed. This first initialization may be further referred to as a stationary initialization. The stationary initialization e.g. performs a substrate thickness measurement, similar as described above, for determining a first part of a disk type of the optical disk, i.e. the part of the disk type corresponding to the substrate thickness. Performing this substrate thickness measurement on a stationary disk may reduce a risk of damaging the optical disk and/or the optical disk drive, in particular the objective lens 18 and/or the focus actuator 24.

When the stationary initialization is completed, the method proceeds to a speed-change phase in block 300. In block 300, the spindle motor 23 starts to rotate the optical disk 1 by increasing the disk speed from zero speed towards a first pre-determined scanning speed. A second initialization, further referred to as a spin-up initialization, is performed while increasing the speed. The spin-up initialization may determine whether a wobble signal is present for determining a second part of the disk type, e.g. for determining an indication whether the optical disk 1 is a read-only disk-type with a track 3 without a wobble, or a writable disk-type with a wobbled track 3. The second part of the disk type may further be associated with a frequency characteristic of the wobble of the optical disk 1, as different groups of disk types as associated with different wobble frequencies. The second part of the disk type may alternatively or further be associated with detecting e.g. a presence of land pre-pits on the optical disk 1 from associated signal characteristics, e.g. for determining whether the optical disk 1 is likely of the group of DVD-R and DVD-RW disk types. The spin-up initialization will be described in more detail below. A second scanning speed may be determined from the disk type as determined up to this stage. E.g., for facilitating reading disk information data, the second scanning speed may be determined from the frequency of the wobble signal and a relationship between wobble frequency and channel bit length, the relationship being derived from e.g. an official disk standard corresponding with the group of disk types.

When the disk speed has reached the first pre-determined scanning speed, or, when the second scanning speed has been determined and the disk speed has reached the second scanning speed, the method proceeds to block 300. In block 300, a further initialization, further referred to as an on-speed initialization, is performed while scanning the disk at the second scanning speed. The on-speed initialization may e.g. read disk information data from the optical disk 1 while focusing on the information layer and tracking the track 3. The disk information data may be used to determine a further part of the disk type for completing the disk type detection. E.g. when it is determined in the spin-up initialization that the optical disk 1 is one of the group of DVD-R and DVD-RW disk types, the disk information data may be read to confirm that the optical disk 1 is one of the group of DVD-R and DVD-RW disk types and to determine whether the optical disk 1 is either a DVD-R type or a DVD-RW type. The on-speed initialization may further determine, e.g. from the disk information, a speed grade of the optical disk 1, for determining write speeds supported by the optical disk 1. When the disk type detection is completed, the on-speed initialization may further include determining a write power value and possibly further write strategy parameter values for optimally writing data onto the optical disk 1 when the optical disk 1 is a writable disk. Determining the write power value and the possibly further write strategy parameter values may comprise performing test recordings for optimizing the write power value and the possibly further write strategy parameter values. After the on-speed initialization in block 400, the method proceeds to block 500.

In an alternative embodiment, one or more of the actions described above as being performed during the on-speed initialization are instead performed during the spin-up initialization. E.g., in an alternative embodiment, the disk information is read from the optical disk 1 in the spin-up initialization in block 300, while the test recordings for optimizing the write power value and the possibly further write strategy parameter values are again performed in the on-speed initialization in block 400. In another alternative embodiment, the disk information is read from the optical disk 1 in the spin-up initialization in block 300, the test recordings for optimizing the write power value and the possibly further write strategy parameter values are also performed in spin-up initialization in block 300 and the on-speed initialization in block 400 is void, i.e. the method directly proceeds from block 300 to a next block 500.

In block 500, all information associated with reading and/or writing the optical disk 1 is available and read and/or write conditions may be set according to this information. The optical disk drive can then proceed with e.g. writing data to the optical disk 1.

Figure 9:
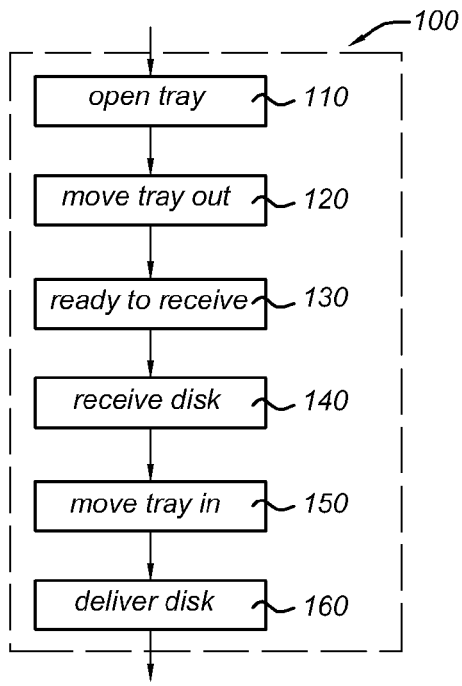

FIG. 9 schematically shows elements of an embodiment of a method according to the invention. In particular, FIG. 9 schematically shows elements of an embodiment of block 100.

The embodiment of block 100 shown in FIG. 9 comprises starting 110 opening the tray 44, i.e. starting the movement of the tray 44 from the "closed" position to the "open" position with the loader motor 43. When the tray 44 holds a previously inserted optical disk, this optical disk is thus ejected from the optical disk drive 99. Next, the tray 44 is moved outward during a first tray movement phase until the tray 44 reaches the "open position" and, in block 130, is ready to receive a (new) optical disk. The optical disk is put in the tray 44 by e.g. a user in block 140. The tray 44 thus receives the optical disk 1. In block 150, the tray 44 is moved into the optical disk drive 99 with the loader motor 43 during a second tray movement phase, until the tray 44 reaches the "closed" position, where the optical disk 1 is delivered to the spindle motor 23.

According to embodiments of the invention, a disk recognition preparation may be performed during a part of the first tray movement phase and/or during a part of the second tray movement phase. This advantageously reduces the startup time compared to known optical disk drives, which perform all disk recognition preparation only after the optical disk 1 has been delivered to the spindle motor 23. In an embodiment, the disk recognition preparation comprises measuring the sensor output signal. As beam is being generated by the source 15 during tray movement, this allows to determine a sensor signal offset. The controller 20 and/or the preprocessor 27 may then use the sensor signal offset for correcting the sensor signal output, for e.g. a dark current, during further use. Likewise, an amplifier offset associated with an amplifying the sensor output signal by e.g. the preprocessor 27 may be determined and used for correcting the sensor output signal during further use. In an embodiment, the disk recognition preparation further comprises determining a position calibration associated with determining a radial position of the optical pickup unit 38. Determining the position calibration may e.g. comprise putting the optical pickup unit 38 in contact with a mechanical reference (not shown), and, e.g., determining a position gauge from acquiring a position measurement signal at that position, or from determining a value of the position control signal 31b. This allows to further use a well-calibrated radial position, which may e.g. be used to determine a linear speed of the optical spot relative to the optical disk from a rotational speed of the optical disk and/or to convert a wobble frequency from a temporal domain to a spatial domain.

Figure 10:
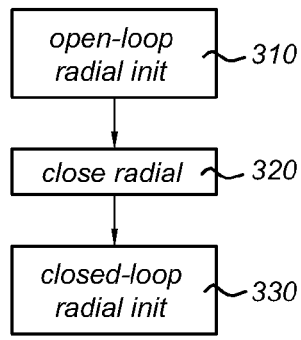

FIG. 10 schematically shows elements of an embodiment of a method according to the invention. In particular, FIG. 10 schematically shows elements of an embodiment of the spin-up initialization in block 300.

The spin-up initialization shown in FIG. 10 comprises a sequence of an open-loop radial initialization 310, closing the radial servo loop 320 and a closed-loop radial initialization 330.

The sensor output signal is analyzed for determining at least one disk characteristic during the open-loop radial initialization 310, e.g. for determining the presence of a wobble signal WS, as will be described below in more detail. In determining at least one disk characteristic, the sensor output signal may be corrected using the offset and/or gain values determined during a disk recognition preparation. When a wobble signal is present, a frequency characteristic of the wobble signal may also be determined during the open-loop radial initialization 310, which may comprise determining the wobble frequency and/or identifying the optical disk 1 to be of a specific group of disk types. The radial tracking mode may then be selected, e.g. a push-pull tracking mode when the specific group of disk types is the group of DVD+R and DVD+RW disks and the radial servo loop closed 320 for tracking the track 3 with the spot. The wobble detector WOB may then decode the wobble signal into wobble data WDAT as part of the closed-loop radial initialization. The wobble data WDAT comprises disk information data, comprising e.g. whether the disk is of the DVD+R type or of the DVD+RW type, speed grade information, e.g. specifying that the disk may be recorded at 6× speed and write power and write strategy information. In an embodiment, the closed-loop radial initialization 330 is completed after reading the wobble data WDAT, and subsequent initializations and calibration procedures are performed only after the spin-up initialization when the speed-change phase has been completed and a settled and stable speed is achieved. Such subsequent initializations and calibration procedures may e.g. comprise an Optical Power Calibration procedure for further optimizing the write power, while still increasing the disk speed during the spin-up initialization.

In an alternative embodiment, the closed-loop radial initialization 330 comprises also all these subsequent initialization and calibration procedures.

Figure 11:
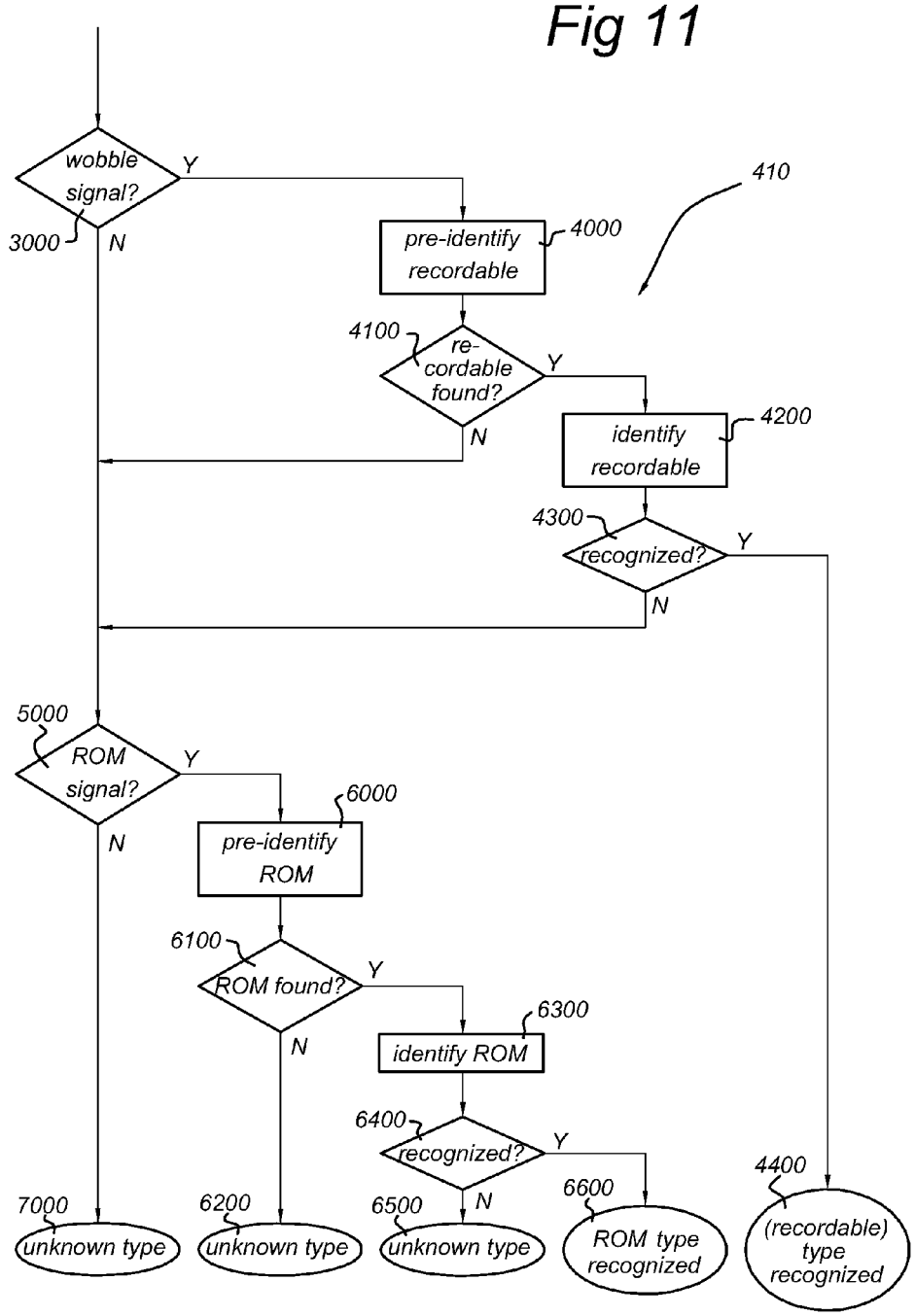

FIG. 11 schematically shows elements of an embodiment of a method according to the invention.

In block 3000, the sensor output signal is analyzed for the presence of a wobble signal WS in the speed-change phase. Analyzing the sensor output signal may include a further disk recognition preparation, wherein e.g. a maximum signal level of the sensor output signal, as received upon receiving reflected light, is determined for determining a further gain and correcting the sensor output signal with the further gain. In an embodiment, the radial error signal is analyzed for the presence of a wobble signal WS. In an alternative embodiment, the central aperture signal HF is analyzed for the presence of a wobble signal WS. In an embodiment, the sensor output signal is analyzed for the presence of a wobble signal WS while the spot is focused in the information layer but before tracking the track, i.e. during closed-loop focus and open-loop radial servo. If a wobble signal is found to be present, the method continues with block 4000; if not, the method continues with block 5000. The wobble signal is present when the sensor output signal is seen to carry a non-negligible component compatible with a signal generated from a wobbled track. Upon detection of the presence of the wobble signal, a pre-identification 4000 is performed to check whether the wobble signal is consistent with the wobbled track according to one of a list of know disk types, e.g. a CD-R, CD-RW, DVD-R, DVD-RW, DVD+R, DVD+RW, DVD-RAM, HDDVD-R, HDDVD-RW, HDDVD-RAM, BD-R or BD-RE. When the wobble signal is consistent with any of the disk types in the list, the disk is pre-classified as a recordable disk in 4100 (recordable here used as the general term including one-time writable, re-recordable and rewritable) and the method proceeds with block 4200. When the wobble signal is not consistent with any of the disk types, the method continues from block 4100 to block 5000.

In block 5000, the sensor output signal is analyzed for a characteristic of a ROM disk. In particular radial error signal and/or the central aperture signal HF is analyzed for a characteristic of a ROM disk, E.g., the central aperture signal HF may be analyzed for the presence of a data signal: as the disk was not identified to be one of the recordable types, the presence of a data signal is a strong indication for the disk being of a read-only type. Alternatively, a differential phase detection signal (DPD signal) may be derived from the sensor output signal 40. A significant presence of a DPD signal is indicative for the presence of data and may thus also indicate the presence of embossed pits on a read-only disk. When block 5000 identifies the presence of a ROM signal, the method continues with block 6000; when not, the method is ended in block 7000 while classifying the disk as being of an unknown type. When further characteristics may be determined or have been determined during the process, e.g. as part of the initialization, the method may alternatively declare the disk to be of a non-supported type, e.g. when a very clear wobble signal unambiguously indicated the disk to be of a recordable type, but the specific recordable type is not supported by the drive (e.g. because the specific wobble frequency was not known).

Upon entering block 4200, the disk is e.g. identified to be a type in one of the groups of a) CD-R and CD-RW type; b) DVD-R and DVD-RW type; c) DVD-R-Qflix type; d) DVD+R and DVD+RW type; e) DVD-RAM type; f) HDDVD-R, HDDVD-RW and HDDVD-RAM type or g) BD-R and BD-RE. As within each group, the wobble frequency is the same between the different disk types in the group and the disk types are very related, the disk type is sufficiently well known to be able to set required read channel parameters, close the radial tracking loop, and read disk information data from the disk while tracking the track with the radial error loop closed. The disk information data comprises detailed information on the disk such as a disk type identifier. The disk type may then be used to conclude on the individual disk type, e.g. to conclude that the disk is a DVD+RW disk and not a DVD-R disk. The disk type identifier may also be used to confirm the disk type detection from the wobble frequency alone, e.g. to confirm that the disk was indeed of the DVD-R-Qflix type and not of another but similar type. When the disk type identifier is not found or not recognized by the controller in the next block 4300, the method proceeds with block 5000. Else, the method concludes in 4400 with the identified disk type.

Block 6000 comprises a pre-identification to classify the assumed read-only disk as one of a list of know disk types, e.g. a CD-ROM, DVD-ROM, HDDVD-ROM or BD-ROM disk. The pre-identification may e.g. comprise checking whether the optical disk 1 satisfies one of a plurality of standardized specifications associated with read-only disks with a substrate thickness as measured during the measurement of the substrate thickness. The pre-identification may e.g. check, when the substrate thickness was determined to be in the range of 1.1-1.2 mm, whether the optical disk 1 satisfies CD-ROM standard requirements on e.g. tracking signal quality and/or data signal quality when focussing on the optical disk 1 with a CD-type laser, and, when the substrate thickness was determined to be approximately 0.6 mm, whether the optical disk 1 satisfies DVD-ROM standard requirements on e.g. differential phase detection signal characteristics when focussing on the optical disk 1 with a DVD-type, red laser. The pre-identification may e.g. check additionally when the substrate thickness was determined to be approximately 0.6 mm and the optical disk 1 did not satisfy DVD-ROM standard requirements, whether the optical disk 1 satisfies HDDVD-ROM standard requirements when focussing on the optical disk 1 with a HDDVD-type, blue-violet laser. When block 6100 concludes the pre-identification not to be successful, the method concludes with block 6200 and declares the disk to be of an unknown type, or alternatively of a not-supported type. When block 6100 concludes the pre-identification to be successful, the method may proceed to block 6300, where read channel parameters are set according to the disk type from the pre-identification (e.g. set disk-type specific phase-lock-loop and equalizer settings associated with bit detection), the radial tracking loop is closed, and disk information data is read from the disk while tracking the track with the radial error loop closed. Again, the disk information data comprises detailed information on the disk such as a disk type identifier. The disk type identifier is then used to confirm the disk type detection from the pre-identification, e.g. to confirm that the disk was indeed of the DVD-ROM type and not of another but similar type. When the disk type identifier is not found or not recognized by the controller in the next block 6400, the method concludes with block 6500 and declares the disk to be of an unknown or alternatively of a not-supported type. Else, the method concludes in 6600 with the identified disk type, being a specific disk type of the read-only disk types.

In the embodiment described above, all blocks shown in FIG. 11 are performed during the speed-change phase. In an alternative embodiment, a subset of blocks is performed during the speed-change phase as spin-up initialization and the other blocks are performed as part of the on-speed initialization. E.g., in an embodiment, only block 3000, 4000 and 4100 are performed in the speed-change phase.

FIG. 12*a* to FIG. 12*f* schematically show exemplary embodiments of the pre-identification 4000 of the recordable disks. The pre-identification is performed using the sensor output signal received during a part of the speed-change phase.

Figure 12A:
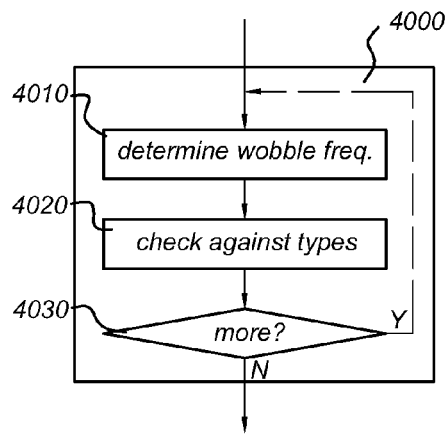

In FIG. 12*a*, the wobble frequency is determined 4010 from determining a dominant frequency in the wobble signal within a frequency band from a plurality of frequency bands. The dominant frequency is then compared against a list of wobble frequencies corresponding to respective wobble periods, each of them associated with a disk type of a plurality of disk types as shown in the list below. It will be appreciated that comparing the frequency against the list of wobble frequencies may comprise a transformation of a temporal frequency at the momentary rotational speed at a substantial radial position of the spot to a spatial frequency and/or a spatial wobble period. It will be understood that the wobble frequency refers to a center wobble frequency when a disk types uses a frequency-modulated wobble. It will be understood that reference to a "wobble period" is substantially equivalent to reference to a "wobble frequency".

| Disk Type | | Channel bit length | Wobble length | Wobble period normalized |
|---|---|---|---|---|
| 1 | DVD-ROM | 133 nm | Not present | Not present |
| 2 | DVD+R | | 32 × | 1.0 |
| 3 | DVD+RW | | | |
| 4 | DVD-R | | 186 × | 5.8 |
| 5 | DVD-RW | | | |
| 6 | DVD-R-QFlix | | 93 × | 2.9 |
| 7 | DVD-RAM | 143 nm | 186 × | 6.2 |
| 8 | HDDVD-ROM | 102 nm | Not present | Not present |
| 9 | HDDVD-R | | 93 × | 2.2 |
| 10 | HDDVD-RW | | | |
| 11 | HDDVD-RAM | | | |

When the dominant frequency is compatible with one of the disk types from the list, the block concludes in 4030 with the corresponding disk type or group of disk types. When not, the wobble frequency may determined 4010 from determining a dominant frequency in the wobble signal within another frequency band in a next iteration of this element of the method. Block 4030 may thus iterate until a disk type is recognized or conclude with an unknown (or not-supported) type when no disk type is recognized after testing all frequency bands.

Figure 12B:
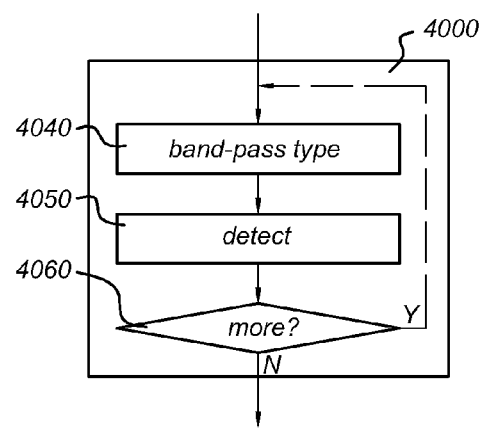

FIG. 12b shows an implementation of the method of FIG. 12a. Block 4040 is an implementation of block 4010, wherein a band-pass filter is applied to the wobble signal, the band-pass filter centered around a frequency corresponding to a wobble frequency of a disk type, which may be an individual disk type or a group of disk types. In block 4050, an implementation of block 4020, the band-passed signal is checked for the presence of a significant amplitude or power. When present, block 4060 concludes with the corresponding disk type. When absent, block 4060 initiates another iteration with another band-pass filter centered around another frequency corresponding to another disk type.

Figure 12C:
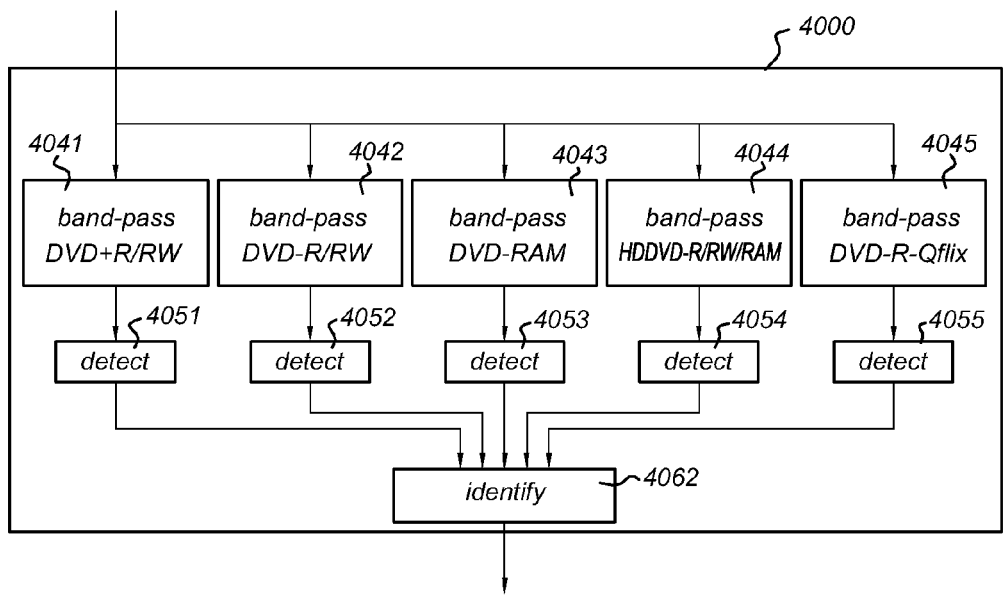

FIG. 12c shows an alternative embodiment of the pre-identification 4000. Five band-pass filters 4041, 4042, 4043, 4044 and 4055 are applied in parallel to the wobble signal. The example shown may be applied when the substrate thickness measurement has shown that the disk has a substrate thickness of 0.6 mm, implying that the disk type should be any of the DVD or HDDVD types. The band-pass filters are set to correspond to a) DVD+R and DVD+RW type; b) DVD+R and DVD+RW type; c) DVD-RAM type; d) HDDVD-R, HDDVD-RW and HDDVD-RAM type and e) DVD-R-Qflix type for filter 4041, 4042, 4043, 4044, 4055 respectively. Detection blocks 4051, 4052, 4053, 4054, 4055 check for the presence of a significant amplitude or power in the respective band-pass filtered signals and communicate their results to an identification block 4062. The identification block 4062 then selects the most likely disk type of the five groups of disk types, if any.

FIG. 12d shows an alternative embodiment of the pre-identification 4000. In stead of applying a plurality of band-pass filters sequentially or in parallel, a correlation 4080 is performed between the wobble signal WS and a sweeping sine, where the sweeping sine is generated in 4070. Once a positive correlation with a momentary frequency of the sweeping sine is detected, block 4090 checks whether the momentary frequency is compatible with any of the wobble frequencies from the list of disk types.

FIG. 12e shows an alternative embodiment of the pre-identification 4000. A frequency selector 4072 selects a frequency or generates a sweeping sine, which is applied as the center frequency to a phase lock loop PLL 4082. The PLL attempts to lock on the wobble signal WS with the applied frequency. Once locking with the applied frequency is successful, block 4092 checks whether the applied frequency is compatible with any of the wobble frequencies from the list of disk types.

FIG. 12f shows an implementation of pre-identification 4000 according to the method of FIG. 12a. For determining the wobble frequency, the sensor output signal is sampled in block 4012 over a sample time interval into a plurality of digital sample values. The sample time interval may be substantially smaller than a momentary rotational period corresponding to a momentary rotational speed during the speed-change phase. In block 4014, a fourier spectrum of the wobble signal is determined and analyzed for determining whether the fourier spectrum comprises a dominant frequency. Determining the fourier spectrum may be performed using a fast fourier transform (FFT). A wobble length may be determined from at least the dominant frequency, the momentary rotational period and the radial position of the spot along the optical disk. Block 4016 then checks whether the wobble length is compatible with any of the wobble lengths from the list of disk types. Block 4016 thus classifies the optical disk from comparing the wobble length against a plurality of pre-determined wobble lengths associated with corresponding optical disk types.

FIG. 13 schematically shows a radial error signal, a wobble signal and a central aperture signal. In this example, the wobble signal is derived from the radial error signal, and the radial error signal is a radial push-pull signal PP. It will be appreciated that using e.g. the central aperture signal HF for obtaining the wobble signal may provide somewhat different, but similar waveforms for the wobble signal as the ones shown in FIG. 13. Time is shown along the horizontal axis of FIG. 13. The vertical axis relates to signal amplitudes of the respective signals.

FIG. 13 shows a trace of the open loop radial push-pull signal 4002, wherein the radial push-pull signal PP is low-pass filtered to obtain a clean signal for radial tracking FIG. 13 further shows a trace of the open loop wobble signal 4004.

FIG. 13 further shows a trace of a band-pass filtered open loop wobble signal 4006, wherein the band-pass filtering was designed to retrieve the wobble signal resulting from the wobble of the track and to remove the low-frequency contribution associated with the spot crossing the track 3 in the radial direction. The band-pass filtering results in a signal substantially symmetrical around its zero level.

The open loop wobble signal 4004 and the band-pass filtered open loop wobble signal 4006 show a large wobble amplitude when the spot is directly above the center of the grooves. The open loop wobble signal 4004 and the band-pass filtered open loop wobble signal 4006 show a high-frequency oscillation with a period Tw corresponding to the wobble period. The period Tw is thus a direct measure of the wobble frequency.

In FIG. 13, also an envelope 4008 of the band-pass filtered open loop wobble signal 4006 is shown. The envelope 4008 further shows a low-frequency envelope variation with a period $T_E$ corresponding to a crossing period of the open loop wobble signal while crossing over the tracks in the radial direction R.

In an embodiment, the sensor signal comprises a radial error signal TE, PP and/or DPD, and the controller is arranged to:

analyze the radial error signal, while the incident beam is focused onto the information layer and before tracking the track with the spot, for finding at least one time moment Ttrk associated with the radial error signal being substantially within a pre-determined error range Err1, and determine a start moment Tstart and a stop moment Tstop of the sample time interval Tsample from the at least one time moment Ttrk.

FIG. 13 shows one time moment Ttrk associated with the radial error signal being substantially within the pre-determined error range Err1, corresponding to the spot being centered substantially at the track 3. The error range Err1 may be centered around zero. As is clear from FIG. 13, the open loop wobble signal 4004 and the band-pass filtered open loop wobble signal 4006 show a substantially maximum amplitude around the time moment Ttrk. Using a relatively short sample time interval Tsample around the time moment Ttrk may thus have an improved signal-to-noise ratio in determining the frequency characteristic, e.g. the wobble length, compared to other time moments.

FIG. 13 further shows a trace 4116 of the central aperture signal HF. Also the envelope 4118, 4119 of the central aperture signal 4116 is shown with an upper envelope signal level 4118 and a lower envelope signal level 4119. The difference between the upper envelope signal level 4118 and the lower envelope signal level 4119 may be referred to as a signal amplitude 4117 of the central aperture signal HF. In an embodiment, the sensor signal comprises a central aperture signal HF with a signal amplitude 4117, and the controller is arranged to:

analyze the signal amplitude 4117 of the central aperture signal HF, while the incident beam is focused onto the information layer and before tracking the track 3 with the spot, for finding at least one time moment TtrkHF associated with the signal amplitude 4117 of the central aperture signal HF being substantially maximal, and determine a start moment TstartHF and a stop moment TstopHF of the sample time interval Tsample from the at least one time moment TtrkHF.

The time moment TtrkHF shown in FIG. 13 is associated with the signal amplitude 4117 of the central aperture signal HF being substantially maximal, and may correspond to the spot being centered substantially at the track 3. As is clear from FIG. 13, the open loop wobble signal 4004 and the band-pass filtered open loop wobble signal 4006 show a substantially maximum amplitude around the time moment TtrkHF. Using a relatively short sample time interval TsampleHF around the time moment TtrkHF may thus have an improved signal-to-noise ratio in determining the frequency characteristic, e.g. the wobble length, compared to other time moments.

In a further embodiment, both the radial error signal and the central aperture signal HF are analyzed while the incident beam is focused onto the information layer and before tracking the track with the spot, for determining a start moment and a stop moment of the sample time interval Tsample, and wherein the radial error signal is within a pre-determined error range Err1 during the sample time interval Tsample and the signal amplitude 4117 of the central aperture signal HF is relatively large.

The disk type may relate to an individual disk type or a group of disk types. The, the group of disk types may comprise at least one of the disk types from the group consisting of:

a CD-R disk type associated with CD-R, a CD-RW disk type associated with CD-RW, a CD-writable disk type associated with CD-R and CD-RW, wherein the CD-R and CD-RW disk types in the group have the same wobble frequency, a DVD-R disk type associated with DVD-R, a DVD-RW disk type associated with DVD-RW, a DVD-minus disk type associated with DVD-R and DVD-RW, wherein the DVD-R and DVD-RW disk types in the group have the same wobble frequency, a DVD+R disk type associated with DVD+R, a DVD+RW disk type associated with DVD+RW, a DVD-plus disk type associated with DVD+R and DVD+RW, wherein the DVD+R and DVD+RW disk types in the group have the same wobble frequency, a DVD-R-QFlix disk type associated with DVD-R-QFlix, a DVD-QFlix disk type associated with at least DVD-R-QFlix, a DVD-RAM disk type associated with DVD-RAM, a HDDVD-R disk type associated with HDDVD-R, a HDDVD-RW disk type associated with HDDVD-RW, a HDDVD-RAM disk type associated with HDDVD-RAM, a HDDVD-recordable disk type associated with HDDVD-R, HDDVD-RW and HDDVD-RAM, all these disk types having the same wobble frequency, a BD-R disk type associated with BD-R, a BD-RE disk type associated with BD-RE, a BD-recordable disk type associated with BD-R and BD-RE, wherein the BD-R and BD-RE disk types in the group have the same wobble frequency, a general recordable disk type associated with at least one of the CD-writable disk type, DVD-minus disk type, the DVD-plus disk type, the DVD-QFlix disk type, the DVD-RAM disk type, the HDDVD-minus disk type, the HDDVD-RAM disk type, all being recordable or rewritable disk types, a CD-ROM disk type associated with CD-ROM, a DVD-ROM disk type associated with DVD-ROM, a HDDVD-ROM disk type associated with HDDVD-ROM, a BD-ROM disk type associated with BD-ROM, a general ROM disk type associated with at least one of the CD-ROM disk type, the DVD-ROM disk type, the HDDVD-ROM disk type and the BD-ROM disk type, all being read-only disk types, a yet-unknown type associated with the disk type not yet having been determined, a not-supported type associated with disk types not supported by the optical disk drive.

In FIG. 14, an overview is given of a computer arrangement that can be used to carry out the method according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601.

The processor 601 is also connected to means for inputting instructions, data etc. by a user, like a keyboard 613, and a mouse 615. Other input means, such as a touch screen, a track ball and/or a voice converter, known to persons skilled in the art may be provided too.

A reading unit 617 connected to the processor 601 is provided. The reading unit 617 is arranged to read data from and possibly write data on a data carrier like a floppy disk 619 or a CD 621. Other data carriers may be tapes, DVD, BD, etc. as is known to persons skilled in the art.

The processor 601 is also connected to a printer 623 for printing output data on paper, as well as to a display 603, for instance, a cathode-ray tube monitor or a LCD (Liquid Crystal Display) screen, or any other type of display known to persons skilled in the art.

The processor 601 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627.

The data carrier 619, 621 may comprise a computer program product in the form of data and instructions arranged to provide the processor with the capacity to perform a method in accordance with the invention. However, such computer program product may, alternatively, be downloaded via the telecommunication network 627.

The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. E.g., a digital signal may be used where an analogue signal is suggested and vice versa, without departing from the scope of the invention and the appended claims. Also, the invention may be analogously applied for e.g. other disk types and other optical disk drive configurations than those explicitly described in the embodiments above. In the claims, any reference signs placed between parentheses shall not be construed as limiting the claim. Throughout this document, the term "and/or" includes any and all combinations of one or more of the associated listed items. Furthermore, the terms "wobble period" and "wobble length" may be read as synonyms, both being expressed in the same unit, i.e. a time unit or a length unit, or alternatively one being expressed in a time unit and the other in a length unit.

The invention claimed is:

1. Optical disk drive for determining a disk characteristic of an optical disk comprising an information layer comprising a track, the optical disk drive comprising:
    an optical pickup unit arranged to:
        generate a beam,
        direct the beam to the optical disk for forming an incident beam,
        sense a reflected beam produced by the optical disk with a sensor upon receiving the incident beam with the sensor,
        produce a sensor output signal from sensing the reflected beam,
        focus the incident beam into a spot on the information layer,
        position the spot at a radial position along the optical disk, and
        track the track with the spot,
    a tray of a loader mechanism arranged to receive the optical disk,
    a loader motor of the loader mechanism arranged to:
        move the tray from a first position to a second position in a tray movement phase, wherein the second position is different from the first position, and
    a controller arranged to:
        receive the sensor output signal during at least one part of the tray movement phase, and
        perform a disk recognition preparation from at least the sensor output signal received during the at least one part of the tray movement phase.

2. The optical disk drive according to claim 1, wherein, for performing the disk recognition preparation, the controller is arranged to determine at least one of an offset associated with producing the sensor output signal corrected with the offset, a gain associated with producing the sensor output signal corrected with the gain, a position calibration associated with calibrating a home position of the optical pickup unit.

3. The optical disk drive according to claim 2, wherein the controller is further arranged to, as part of the disk recognition preparation, perform at least one of the following actions:
    set the optical pickup unit at the home position,
    set an adjustable optical component of the optical pickup unit to a pre-determined condition, and
    condition a signal processing of the sensor output signal with at least one of the offset and the gain.

4. Optical disk drive for determining a disk characteristic of an optical disk comprising an information layer comprising a track, the optical disk drive comprising:
    an optical pickup unit arranged to:
        generate a beam,
        direct the beam to the optical disk for forming an incident beam,
        sense a reflected beam produced by the optical disk with a sensor upon receiving the incident beam with the sensor,
        produce a sensor output signal from sensing the reflected beam,
        focus the incident beam into a spot on the information layer,
        position the spot at a radial position along the optical disk, and
        track the track with the spot,
    a spindle arranged to receive the optical disk,
    a spindle motor arranged to:
        rotate the spindle from a first rotating speed to a second rotating speed in a speed-change phase, wherein the first rotating speed is different from the first rotating speed, and
    a controller arranged to:
        receive the sensor output signal during at least one part of the speed-change phase, and
        perform at least part of determining the disk characteristic from at least the sensor output signal received during the at least one part of the speed-change phase, wherein as part of determining the at least disk characteristic, the controller is arranged to:
            receive the sensor output signal while the incident beam is focused onto the information layer,
            analyze the sensor output signal for detecting whether a wobble signal is present, indicating whether the track is wobbled, upon detecting the presence of the wobble signal, determine a frequency characteristic of the wobble signal by receiving the sensor output signal over a sample time interval, the sample time interval being substantially smaller than a momentary rotational period corresponding to a momentary rotational speed during the speed-change phase, and classify the optical disk in dependence on the frequency characteristic.

5. The optical disk drive according to claim 4, wherein, to classify the optical disk in dependence on the frequency characteristic, the controller is arranged to:

determine a fourier spectrum of the wobble signal, analyze whether the fourier spectrum comprises a dominant frequency, determine a wobble length from at least the dominant frequency, the momentary rotational period and the radial position of the spot along the optical disk, and classify the optical disk from comparing the wobble length against a plurality of pre-determined wobble lengths associated with corresponding optical disk types.

6. The optical disk drive according to claim 5, wherein the controller is arranged to determine the fourier spectrum of the wobble signal using a fast fourier transform.

7. The optical disk drive according to claim 4, wherein the controller is arranged to:

analyze the sensor signal while the incident beam is focused onto the information layer and before tracking the track with the spot, for finding at least one time moment associated with the spot being substantially centered at the track, and determine a start moment and a stop moment of the sample time interval from the at least one time moment.

8. The optical disk drive according to claim 7, wherein the sensor signal comprises a radial error signal and the controller is arranged to:

analyze the radial error signal while the incident beam is focused onto the information layer and before tracking the track with the spot, for finding at least one time moment associated with the radial error signal being substantially within a pre-determined error range, and determine a start moment and a stop moment of the sample time interval from the at least one time moment.

9. The optical disk drive according to claim 8, wherein and the controller is arranged to analyze the radial error signal while the spot is moving in a pre-determined substantially radial direction substantially perpendicular to the track.

10. The optical disk drive according to claim 7, wherein the sensor signal comprises a central aperture signal (HF) with a signal amplitude, and the controller is arranged to:

analyze the signal amplitude of the central aperture signal (HF) while the incident beam is focused onto the information layer and before tracking the track with the spot, for finding at least one time moment associated with the signal amplitude of the central aperture signal being substantially maximal, and determine a start moment and a stop moment of the sample time interval from the at least one time moment.

11. The optical disk drive according to claim 7, wherein the sensor signal comprises a central aperture signal (HF) with a signal amplitude and a radial error signal, and the controller is arranged to:

analyze the radial error signal while the incident beam is focused onto the information layer and before tracking the track with the spot, for finding at least one first time moment associated with the radial error signal being substantially within a pre-determined error range, analyze the signal amplitude of the central aperture signal (HF) while the incident beam is focused onto the information layer and before tracking the track with the spot, for finding at least one second time moment associated with the signal amplitude of the central aperture signal being substantially maximal, determine at least one common time moment from the at least one first time moment and the at least one second time moment, and determine a start moment and a stop moment of the sample time interval from the at least one common time moment.

12. The optical disk drive according to claim 1, wherein the at least one disk characteristic comprises at least one disk calibration characteristic being associated with at least one calibration of a group comprising:

an optical disk type generation associated with determining a substrate thickness corresponding to the optical disk type generation, a sensor output signal amplitude calibration associated with determining a sensor output signal gain for scaling the sensor output signal into a pre-determined range, an offset calibration associated with at least one of determining a focus offset for optimally focusing the incident beam into the spot on the information layer and determining a radial offset for optimally tracking the track with the spot, a layer count associated with determining a number of information layers of the optical disk, a spot quality calibration associated with at least one of determining a spherical aberration correction to the incident beam for forming the spot with an optimal spot size and determining a tilt correction to the incident beam for forming the spot with an tilt-corrected spot shape, and a radial position calibration associated with at least one of determining a relative position between a rotational axis of the disk motor and a pre-determined area on the optical disk.

13. Method to determine a disk characteristic of an optical disk in an optical disk drive comprising an information layer comprising a track, the method being arranged for:

generating a beam, directing the beam to the optical disk for forming an incident beam, sensing a reflected beam produced by the optical disk upon receiving the incident beam, producing a sensor output signal from sensing the reflected beam with a sensor, focusing the incident beam into a spot on the information layer, and positioning the spot at a radial position along the optical disk, receiving the optical disk with a disk receiving device, providing a transition of the disk receiving device from a first mode to a second mode in a speed-change phase, associated with changing a rotational speed of a spindle arranged for receiving an optical disk and for rotating an optical disk with a rotational speed, and the method comprises changing the rotational speed of the spindle with a spindle motor, receiving the sensor output signal during at least one part of the speed-change phase, and performing at least part of determining the disk characteristic from at least the sensor output signal received during the at least one part of the speed-change phase, wherein determining the at least one disk characteristic from at least the sensor output signal comprises:

determining a frequency characteristic of a wobble signal by receiving the sensor output signal over a sample time interval, the sample time interval being substantially smaller than a momentary rotational period corresponding to a momentary rotational speed during the speed-change phase, and classifying the optical disk in dependence on the frequency characteristic.

14. The method according to claim 13, wherein determining the disk characteristic comprises performing a disk recognition preparation from at least the sensor output signal received during the at least one part of the speed-change phase.

15. The method according to claim 13, wherein the at least one disk characteristic comprises a disk type.

16. The method according to claim 13, wherein receiving the sensor output signal is performed before tracking the track with the spot.

17. Method to determine a disk characteristic of an optical disk in an optical disk drive comprising an information layer comprising a track, the method being arranged for:

generating a beam, directing the beam to the optical disk for forming an incident beam, sensing a reflected beam produced by the optical disk upon receiving the incident beam, producing a sensor output signal from sensing the reflected beam with a sensor, focusing the incident beam into a spot on the information layer, and positioning the spot at a radial position along the optical disk, receiving the optical disk with a disk receiving device, providing a transition of the disk receiving device from a first mode to a second mode in at least one transition phase, wherein one of the at least one transition phase is a tray movement phase, associated with moving a tray arranged for loading an optical disk into the optical disk drive, and the method comprises moving the tray with a tray motor, and receiving the sensor output signal during at least one part of the tray movement phase, and performing at least part of determining the disk characteristic from at least the sensor output signal received during the at least one part of the tray movement phase.

* * * * *